United States Patent [19]

Marion et al.

[11] 4,400,180

[45] * Aug. 23, 1983

[54] PARTIAL OXIDATION PROCESS

[75] Inventors: Charles P. Marion, Mamaroneck; William B. Crouch, Chappaqua; Albert Brent, Huntington, all of N.Y.; George N. Richter, San Marino, Calif.; Edward T. Child, Tarrytown, N.Y.; Blake Reynolds, Riverside, Conn.

[73] Assignee: Texaco, Inc., White Plains, N.Y.

[*] Notice: The portion of the term of this patent subsequent to Jul. 6, 1999 has been disclaimed.

[21] Appl. No.: 272,419

[22] Filed: Jun. 10, 1981

Related U.S. Application Data

[63] Continuation-in-part of Ser. No. 212,054, Dec. 3, 1980, Pat. No. 4,371,378, which is a continuation-in-part of Ser. No. 167,876, Jul. 14, 1980, Pat. No. 4,351,645, which is a continuation-in-part of Ser. No. 107,215, Dec. 26, 1979, Pat. No. 4,338,099.

[51] Int. Cl.³ .............................................. C10J 3/46
[52] U.S. Cl. .................................... 48/197 R; 48/206; 48/215; 48/DIG. 7; 48/212; 252/373
[58] Field of Search ..................... 48/197 R, 200, 201, 48/203, 206, 215, DIG. 7, 180 F, 180 C, 180 P, 209, 212; 252/373; 137/9; 431/2, 6, 11, 12, 90

[56] References Cited

U.S. PATENT DOCUMENTS

| 3,607,156 | 9/1971 | Schlinger et al. | 48/197 R |
|---|---|---|---|
| 3,758,037 | 9/1973 | Marion et al. | 252/373 |
| 3,972,690 | 8/1976 | Van Os | 48/212 |
| 4,111,637 | 9/1978 | Hillman | 431/90 |
| 4,144,997 | 3/1979 | Anderson | 431/90 |
| 4,277,254 | 7/1981 | Hanson | 48/180 R |

Primary Examiner—Peter F. Kratz
Attorney, Agent, or Firm—Carl G. Ries; Robert A. Kulason; Albert Brent

[57] ABSTRACT

A partial oxidation process and control system for continuously producing synthesis gas, fuel gas or reducing gas in which one process fuel is replaced by a different fuel without shutting down or depressurizing the gas generator. This multifuel process is not tied to one particular fuel and reacts slurries of solid carbonaceous fuel and/or liquid or gaseous hydrocarbonaceous fuels. Suitable burners for introducing the feedstreams into the gas generator comprise a central conduit means radially spaced from a concentric coaxial outer conduit having a downstream exit nozzle, and providing a coaxial annular passage means therebetween. The central conduit means may be retracted upstream from the burner face a distance of about 0 to 12 and preferably 3 to 10 times the minimum diameter of the central exit orifice. A premix zone is preferably provided comprising one or more, say 2 to 5 coaxial chambers in series where substantial mixing of the reactant streams and optionally volatilization of the slurry medium takes place. A control system is provided for switching the type of reactant fuel stream flowing through either the central conduit means or the annular passage means of the burner and adjusting the flow rates of the reactant stream of free-oxygen containing gas.

12 Claims, 3 Drawing Figures

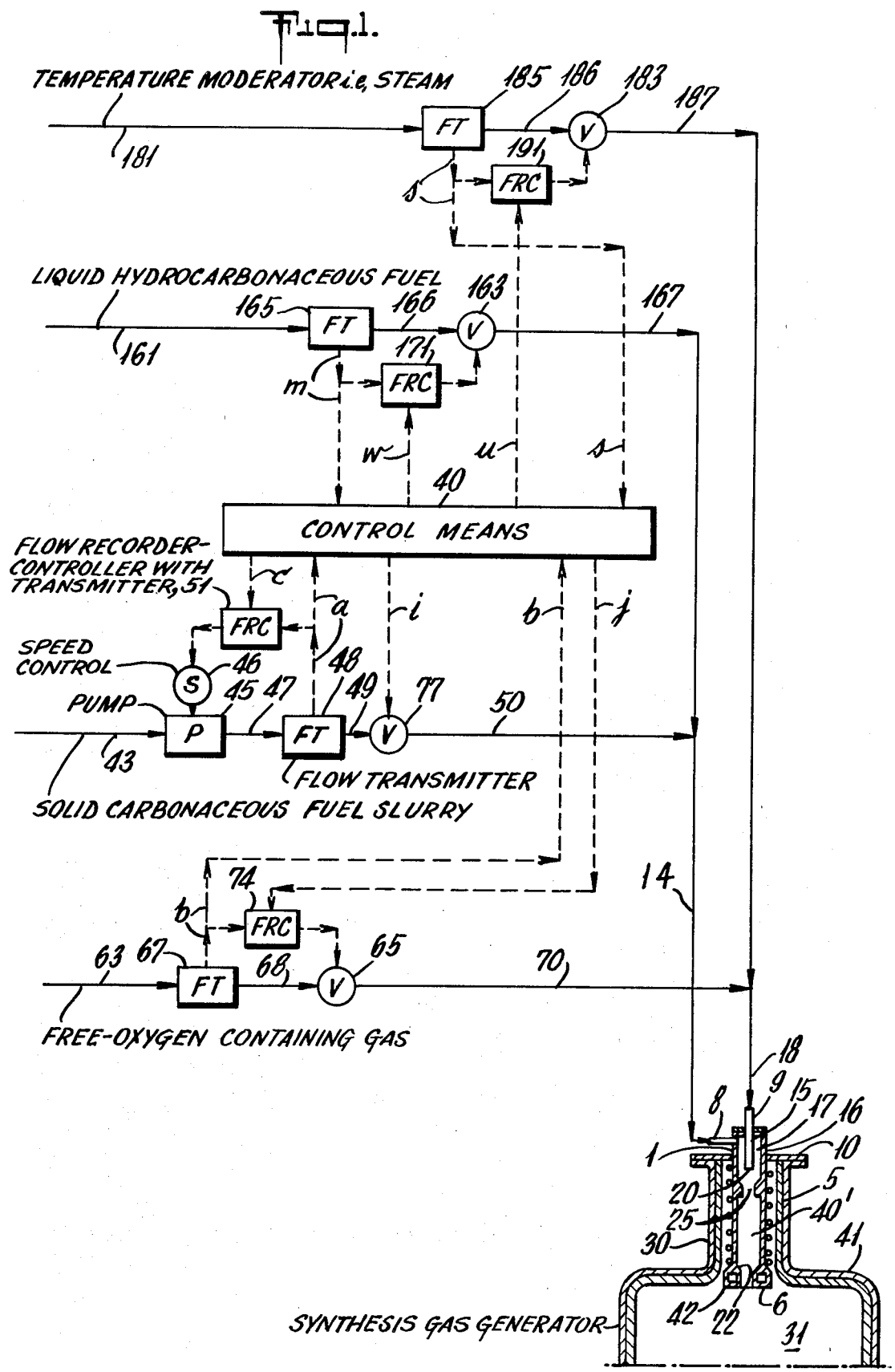

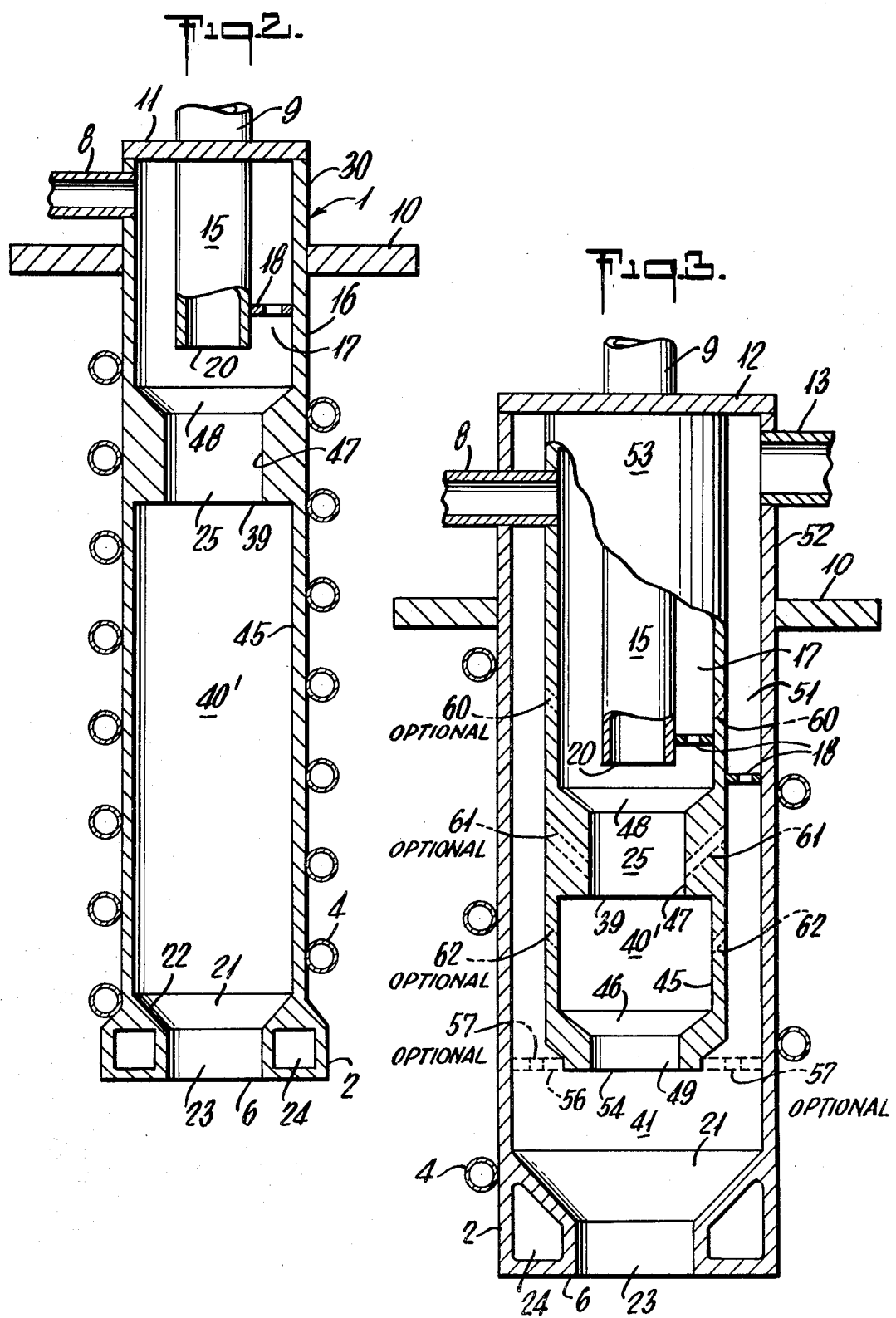

PARTIAL OXIDATION PROCESS

This application is a continuation-in-part of application Ser. No. 212,054, filed Dec. 3, 1980 and now U.S. Pat. No. 4,371,378, which application is a continuation-in-part of application Ser. No. 167,876, filed July 14, 1980 and now U.S. Pat. No. 4,351,645, which application is a continuation-in-part of application Ser. No. 107,215, filed Dec. 26, 1979, and now U.S. Pat. No. 4,338,099.

BACKGROUND OF THE INVENTION

1. Field of the Invention

This invention relates to the manufacture of gaseous mixtures comprising $H_2$ and CO, e.g., synthesis gas, fuel gas, and reducing gas by the partial oxidation of pumpable slurries of solid carbonaceous fuels in a liquid carrier and/or liquid or gaseous hydrocarbon fuels. In one of its more specific aspects, the present invention pertains to switching from one type of fuel to another without interruption of the process.

2. Description of the Prior Art

In the operation of a partial oxidation synthesis gas generator when the principal fuel becomes unavailable or in short supply and it is desired to operate the gas generator with a substitute or stand-by fuel, then previously it was necessary to depressurize the system and shut down the gas generator while the burner is changed and other adjustments are made to the system to provide for the new fuel. By the subject process, such costly down-time is avoided.

Annulus-type burners have been employed for introducing liquid hydrocarbonaceous fuels into a partial oxidation gas generator. For example, coassigned U.S. Pat. No. 3,528,930 shows a single annulus burner, and coassigned U.S. Pat. Nos. 3,758,037 and 3,847,564 show double annulus burners. To obtain proper mixing, atomization, and stability of operation a burner is sized for a specific throughput. Should the type of fuel feedstream change substantially, ordinarily shut-down of the system is required to replace one burner with another. Such costly shut-downs are avoided by the subject process and control system. The more complex process for preheating a gas generator by means of a preheat burner, removing the preheat burner from the gasifier, and inserting a separate production burner is described in coassigned U.S. Pat. No. 4,113,445.

SUMMARY OF THE INVENTION

A partial oxidation process and control system for continuously producing synthesis gas, fuel gas or reducing gas while changing from one type of fuel to another without shutting down or depressurizing the gas generator is described. This multifuel process is not tied to one particular fuel and reacts slurries of solid carbonaceous fuel and/or liquid or gaseous hydrocarbonaceous fuels. Problems of fuel availability are reduced due to the wide selection of fuels that are suitable for the subject process. By the subject process the total output from the partial oxidation gas generator may be maintained substantially constant while the feed is changed from one fuel to another.

The subject invention pertains to a method for producing gaseous mixtures comprising $H_2$, CO, $CO_2$, entrained particulate carbon and at least one material from the group consisting of $H_2O$, $N_2$, $H_2S$, COS, $CH_4$, $A_r$, and ash in a free-flow noncatalytic partial oxidation gas generator including the improvement employing a burner comprising a central conduit means radially spaced from a concentric coaxial outer conduit means having a downstream exit nozzle and providing a coaxial annular passage means therebetween and changing from one reactant feedstream to another without shutting down or depressurizing the system comprising the steps of:

(1) passing a first reactant stream of first solid carbonaceous fuel slurry or hydrocarbonaceous fuel with or without mixture with a temperature moderator such as $H_2O$ through either the central conduit means or through the annular passage means of said burner;

(2) simultaneously passing a separate reactant stream of free-oxygen containing gas with or without mixture with a temperature moderator through the unused fluid passage means in said burner;

(3) mixing together said reactant streams from (1) and (2) to produce a well-distributed blend, and reacting said mixture by partial oxidation in the reaction zone of said gas generator at an autogenous temperature in the range of about 1,700° to 3,500° F., a pressure in the range of about 1 to 300 atmospheres, an atomic ratio of oxygen/carbon in the range of about 0.5 to 1.7, and a weight ratio $H_2O$/fuel in the range of about 0 to 5.0, such as 0.1 to 3.0;

(4) phasing out of the fluid passage means in which it is flowing in said burner said stream of first solid carbonaceous fuel slurry or hydrocarbonaceous fuel with or without mixture with a temperature moderator, such as $H_2O$, said phasing out being with a uniformly decreasing rate of flow that varies from maximum to 0 over a period of time in the range of about 1–3600 seconds; and simultaneously phasing said stream of second solid carbonaceous fuel slurry or hydrocarbonaceous fuel with or without mixture with a temperature moderator, such as $H_2O$ into the same fluid passage means in said burner at a uniformly increasing rate of flow that varies from 0 to maximum rate over the same period of time and mixing with the remaining portion of and replacing the phased out portion of said stream of first solid carbonaceous fuel slurry or hydrocarbonaceous fuel with or without mixture with a temperature moderator, such as $H_2O$ flowing therein; and (5) adjusting the flow rate of the reactant stream of free-oxygen containing gas with or without mixture with a temperature moderator passing through the burner and if necessary introducing supplemental $H_2O$ into the reaction zone to adjust the free oxygen/carbon atomic ratio and the weight ratio $H_2O$/fuel in the reaction zone to design conditions for the partial oxidation reaction.

Manual or automatic control means are included for switching and controlling the fuel, oxidant, and steam streams. By this means, the principal and stand-by fuels may be switched and the stream of free-oxygen containing gas and/or temperature moderator may be controlled up or down—to maintain the gasifier output while retaining efficiency and stability.

BRIEF DESCRIPTION OF THE DRAWING

In order to illustrate the invention in greater detail, reference is made to several embodiments as shown in the figures of the drawing wherein FIG. 1 is a schematic representation of one embodiment of the invention showing control means for replacing one fuel with another while maintaining continuous operation.

FIGS. 2 and 3 are vertical longitudinal schematic representation of two embodiments of preferred burners for use in the subject process.

DESCRIPTION OF THE INVENTION

The present invention pertains to a continuous process for the manufacture of gas mixtures comprising $H_2$, CO, $CO_2$, particulate carbon and at least one material selected from the group consisting of $H_2O$, $N_2$, $A_r$ $CH_4$, $H_2S$, COS, and ash such as synthesis gas, fuel gas, and reducing gas, by the partial oxidation of one reactant stream of fuel which is then replaced by a different reactant stream of fuel without shutting down or depressurizing the gas generator. Further, there may be substantially no change in the amount of gas produced. This multifuel process is not restricted to one particular fuel. Problems of fuel availability are reduced. The two reactant fuel streams may be selected from the group consisting of a pumpable slurry of solid carbonaceous fuel in a liquid carrier, liquid or gaseous hydrocarbonaceous fuel, and mixtures thereof with or without admixture with a temperature moderator. The fuels are reacted by partial oxidation with a reactant stream of free-oxygen containing gas with or without admixture with a temperature moderator. The product gas mixture is produced in the reaction zone of a noncatalytic, refractory-lined, free-flow partial oxidation gas generator, such as described in coassigned U.S. Pat. No. 2,809,104 issued to Dale M. Strasser et al. at a temperature in the range of about 1,700° to 3500° F. and a pressure in the range of about 1 to 300 atmospheres, such as about 5 to 250 atmospheres, say about 10 to 100 atmospheres.

During operation of the partial oxidation gas generator, it may be necessary to change from one fuel to another without replacing the burner and without sacrificing stable operation and efficiency. Changing the burner requires a costly shut-down period with resultant delay. Further, the burner should operate with a variety of liquid, solid, and gaseous fuels, and mixtures thereof. Combustion instability and poor efficiency can be encountered when certain prior art burners are used for the gasification of liquid phase slurries of solid carbonaceous fuels. Further, feedstreams may be poorly mixed and solid fuel particles may pass through the gasifier without contacting significant amounts of oxygen. Unreacted oxygen in the reaction zone may then react with the product gas.

A novel burner that may be employed in the subject process is shown in FIG. 2 of the drawing and comprises: a retracted central conduit means coaxial with the central longitudinal axis of the burner and having an upstream inlet through which a first feedstream may be separately introduced and a downstream discharge outlet means; an outer coaxial conduit concentric with said central conduit and having an upstream inlet through which a second feedstream may be separately introduced, and a converging at least partially frusto-conical shaped exit nozzle terminating said outer conduit at the downstream tip of the burner; wherein said central conduit downstream discharge outlet means is retracted upstream from the downstream face of the burner a distance of two or more times say 3 to 10 times the minimum diameter of said outer conduit downstream exit nozzle to provide a pre-mix zone; and means for radially spacing said central and outer conduits from each other to provide a coaxial annular passage through which said second feedstream may separately pass concurrently with said first feedstream into said pre-mix zone where a multiphase mixture is produced prior to being discharged through said outer conduit exit nozzle.

Another novel burner that may be employed in the subject process is shown in FIG. 3 of the drawing and comprises: a central conduit coaxial with the central longitudinal axis of the burner and having an upstream inlet through which a first feedstream may be introduced and a circular downstream discharge outlet, and said central conduit discharge outlet is retracted upstream from the downstream face of the burner a distance of 3 to 10 times the minimum diameter of an outer conduit downstream exit nozzle to be further described so as to provide a pre-mix zone comprising 2 to 5 cylindrically shaped pre-mix chambers in series and coaxial with the central longitudinal axis of said burner; an intermediate coaxial conduit concentric with said central conduit and having an upstream inlet through which a second feedstream may be introduced, and a converging at least partially frusto-conical shaped downstream exit nozzle terminating said intermediate conduit, and the top of said intermediate conduit exit nozzle is retracted upstream from the downstream face of the burner a distance of 1 to 5 times the minimum diameter of said outer conduit donwstream exit nozzle; an outer coaxial conduit concentric with said central and intermediate conduits and having an upstream inlet through which a third feedstream may be introduced, and a converging downstream exit nozzle terminating said outer conduit and comprising a frusto-conical shaped rear portion and a right cylindrical shaped front portion at the downstream tip of the burner; and means for radially spacing said central, intermediate, and outer conduits with respect to each other to provide intermediate and outer coaxial annular passages, and said intermediate annular passage is situated between the outside diameter of the central conduit and the inside diameter of the intermediate conduit and is the passage through which said second feedstream may separately pass concurrently with said first feedstream into a pre-mix zone where a multiphase mixture of said first and second feedstream is produced, and said outer annular passage is situated between the outside diameter of said intermediate conduit and the inside diameter of said outer conduit and is the passage through which said third feedstream may separately pass concurrently with said first and second feedstreams and then mix with said multiphase mixture of said first and second feedstreams upstream from the downstream face of the burner. Optionally, the walls of said intermediate conduit may contain a plurality of small diameter holes or passages in a plurality of circumferential rings along its length to permit at least a portion of said third feedstream flowing in said outer annular conduit to pass through and mix with one or more of the other materials simultaneously flowing at a lower pressure through the other passages or pre-mix zone of the burner. Optionally, blocking means may be provided at the downstream outlet of said outer annular passage for completely or partially closing the downstream outlet of said outer annular passage. The blocking means may comprise an annular plate disposed perpendicular to the central longitudinal axis of the burner with or without a plurality of small diameter holes. Said third feedstream may be a temperature moderator selected from the group consisting of $H_2O$, $CO_2$, $N_2$ and mixtures thereof. Alternatively, a recycle portion of cooled and cleaned product gas or a stream of free-oxygen containing gas may comprise the third feedstream.

Thus, in this embodiment of the burner, as shown in FIG. 3, a plurality of high pressure high velocity jet streams of said third feedstream may be passed through the walls of the intermediate conduit and into the annular passage and pre-mix chambers at various locations along their length. By this means atomizing of the fuel feedstream and, optionally, mixing it with the oxidant stream may be facilitated. For example, the third feedstream may be passed through a plurality of small diameter passages or holes i.e. about 0.032 to 0.50 diameter that lead into said annular passage and pre-mix chambers.

In other embodiments an annular-type burner such as shown and described in coassigned U.S. Pat. No. 3,874,592 was employed. Further, the central and/or annular conduit means may include a plurality of parallel or helical tubes.

Alignment pins, fins, centering vanes, spacers and other conventional means are used to symmetrically space the burner conduits with respect to each other and to hold same in stable alignment without obstructing the free-flow of the feedstreams in the central conduit means and annular passage means.

The outer and/or intermediate conduit exit nozzle may comprise a frusto-conical rear portion having a converging angle in the range of about 15° to 90° from the central longitudinal axis of the burner. The rear portion may develop into a normal cylindrical front portion which terminates at the downstream face of the burner. The cylindrical front portion may have a height in the range of about 0 to 1.5 times its own diameter. In one embodiment, the outer conduit exit orifice is in the shape of or is generated by an American Society of Mechanical Engineer's standard long-radius nozzle. A further description of said nozzle may be found in "Thermodynamics Fluid Flow and Heat Transmission" by Huber O. Croft, page 155, First Edition, 1938 McGraw-Hill Book Company.

The burner may be cooled on the outside by means of cooling coils that encircle the outside barrel of the burner along its length. The downstream end of the burner may be provided with a cored face plate through which a coolant is circulated. For example, an annular cooling chamber may encircle the outer conduit downstream exit nozzle. The cooling chamber and the outer conduit exit nozzle may constitute a single piece of thermal and wear resistant material such as tungsten carbide or silicon carbide. Any suitable coolant may be employed e.g. water. Preferably, the downstream end of the central conduit means may be retracted upstream from the entrance to the first pre-mix chamber in the line. For example, the set back of the end of the central conduit means from the entrance to the first pre-mix chamber may be in the range of about 0.1-2.0 times the diameter of the first pre-mix chamber.

In one embodiment, each of the pre-mix chambers in the central conduit except the first are cylindrical shaped and comprises a coaxial cylindrical body portion followed by a coaxial at least partially converging outlet portion. The first cylindrical-shaped pre-mix chamber in the central conduit comprises a normal coaxial cylindrical body portion that discharges directly into the next in line coaxial cylindrical shaped pre-mix chamber. The converging outlet portions of said pre-mix chambers may be made from tungsten carbide or silicon carbide for increased wear resistance.

The size relationship between successive pre-mix chambers in the subject burners may be expressed in the following manner: For burners in which the pre-mix chambers in the central conduit means are successively numbered 1 to 5, then the ratio of the diameter of any one of said central chambers to the diameter of the next central chamber in the line i.e. $D_1:D_2$; $D_2:D_3$; $D_3:D_4$; or $D_4:D_5$ may be in the range of about 0.2–1.2. The ratio of the length of any one central pre-mix chamber in said central conduit means to the length of the next central pre-mix chamber in the line i.e. $L_1:L_2$; $L_2:L_3$; $L_3:L_4$; or $L_4:L_5$ may be in the range of about 0.1–1.0.

In the operation of the embodiment of the burner employing pre-mix chambers flow control means may be used to control the flow of the feedstreams to the passages in the burner in the same manner as described previously. The feedstreams entering the burner and simultaneously and concurrently passing through at different velocities impinge and mix with each other in the first pre-mix chambers. The impingement of one reactant stream, such as the liquid slurry of solid carbonaceous fuel in a liquid medium optionally in admixture with a temperature moderator, with another reactant stream, such as a gaseous stream of free-oxygen containing gas optionally in admixture with a temperature moderator at a higher velocity, causes the liquid slurry to break up into a fine spray. The multiphase mixture produced then successively passes through any remaining pre-mix chambers where additional mixing takes place. As the mixture passes freely through the subject unobstructed burner its velocity changes many times. For example, at various points in the burner the velocity of the mixture may range from about 20 to 600 ft. per sec. As the mixture flows from one pre-mix chamber to the next, the velocity changes are mainly the result of changes in the diameter of the flow path and the temperature of the mixture. This promotes a thorough mixing of the components. By operating in the region of turbulent flow, mixing may be maximized. Further, direct heat exchange between the materials takes place within the burner. From 0–100 vol. %, say about 5–25 vol. % of the liquids in the feedstreams may be vaporized before the feedstreams leave the burner. By means of converging exit orifices, the feedstreams may be accelerated directly into the reaction zone of the partial oxidation gasifier.

Burning of the combustible materials while passing through the pre-mix zone of the burner may be prevented by discharging the multiphase mixtures at the outer conduit exit nozzle at the tip of the burner with a discharge velocity which is greater than the flame propagation velocity. Flame speeds are a function of such factors as composition of the mixture, temperature and pressure. They may be calculated by conventional methods or determined experimentally. Advantageously, by means of the subject burner, the exothermic partial oxidation reactions take place a sufficient distance downstream from the burner face so as to protect the burner from thermal damage.

Depending on such factors as the temperature, velocity, dwell time and composition of the feedstreams; the desired amount of vaporization of liquid carrier; the temperature and amount of recycle gases in the generator; and the desired life of the burner; cooling coils may or may not encircle the outside barrel of the burner along its length. For similar reasons, the burner may or may not be provided with an annular shaped cooling chamber at the downstream end.

Liquid hydrocarbon fuels and/or pumpable slurries of solid carbonaceous fuels having a dry solids content in the range of about 30 to 75 wt. %, say about 40 to 70 wt. % may be passed through the inlet passages of the subject burner. For example, the fuel streams with or without mixture with the temperature moderator i.e. $H_2O$ may be passed through the central conduit means or through the annular passage means. The inlet temperature of the liquid hydrocarbon fuel or the slurry is in the range of about ambient to 500° F., but preferably below the vaporization temperature of the liquid hydrocarbon at the given inlet pressure in the range of about 1 to 300 atmospheres, such as 5 to 250 atmospheres, say about 10 to 100 atmospheres. Simultaneously the free-oxygen containing gas with or without mixture with the temperature moderator is passed through the corresponding unoccupied passage in the burner.

Thus, if the principal or first fuel flowing through a central conduit means of the burner or through the coaxial annular passage means of the burner becomes unavailable and it is desired to switch to a stand-by or second fuel, or for any reason whatsoever it is desired to switch from a first solid carbonaceous fuel slurry or hydrocarbonaceous fuel to a second solid carbonaceous fuel slurry or hydrocarbonaceous fuel without shutting down or depressurizing the system, one may proceed as follows:

(1) separately sensing the flow rates of four feedstreams 1–4 respectively consisting of steam, stand-by fuel, prinicipal fuel, and free-oxygen containing gas, and providing signals s, m, a, and b corresponding respectively to the actual flow rates of feedstreams 1–4 to a control unit;

(2) comparing said actual flow rate signals s, m, a, and b respectively with manual or automatically computed and inserted input signals representing the desired flow rate or set point for that moment for each of the four feedstreams, and providing a corresponding adjustment signal to a flow rate control means for controlling the flow rate of each feedstream 1–4 in accordance with the respective set point of each;

(3) passing a feedstream of said principal fuel into the reaction zone of a free-flow noncatalytic partial oxidation gas generator, by way of a burner comprising a central conduit means radially spaced from a concentric coaxial outer conduit means having a downstream exit nozzle and providing a coaxial annular passage means therebetween and wherein said feedstream of principal fuel is passed through either the cental conduit means of the burner or through the coaxial annular passage means;

(4) simultaneously passing a separate feedstream of free-oxygen containing gas with or without mixture with a separate feedstream of steam through the unoccupied fluid passage means in said burner;

(5) mixing together said reactant streams from (3) and (4) to produce a well-distributed blend, and reacting said mixtures by partial oxidation in the reaction zone of said gas generator at an autogenous temperature in the range of about 1700° to 3500° F., a pressure in the range of about 1 to 300 atmospheres, an atomic ratio of oxygen/carbon in the range of about 0.5 to 1.7, and a weight ratio $H_2O$/fuel in the range of about 0 to 5.0, such as about 0.1 to 3.0;

(6) replacing in said central conduit means or annular passage means said feedstream of principal fuel with a replacement feedstream of stand-by fuel by phasing out of the fluid passage means in which it is flowing said stream of principal fuel comprising first solid carbonaceous fuel slurry or hydrocarbonaceous fuel, said phasing out being with a uniformly decreasing rate of flow that varies from maximum to 0 over a period of time in the range of about 1–3600 seconds; and simultaneously phasing said stream of stand-by fuel comprising second solid carbonaceous fuel slurry or hydrocarbonaceous fuel into the same fluid passage means at a uniformly increasing rate of flow that varies from 0 to maximum rate over the same period of time and mixing with the remaining portion of and replacing the phased out portion of said stream of first solid carbonaceous fuel slurry or hydrocarbonaceous fuel; and simultaneously with or after the completion of said replacement of feedstreams; and simultaneously with or following (6);

(7) adjusting the flow rate of the feedstream of free-oxygen containing gas passing through the burner, and if necessary introducing supplemental $H_2O$ into the reaction zone so as to adjust the free oxygen/carbon atomic ratio and the weight ratio $H_2O$/fuel in the reaction zone at design conditions for the partial oxidation reaction.

By means of the subject process the temperature in the reaction zone may be maintained substantially constant i.e. a variation of less than ±200° F., and the weight ratio $H_2O$/fuel may be maintained in the range of about 0.1 to 3.0.

In the subject flow control means a manual or automatically controlled flow recorder-controller with transmitter is employed to provide signals to a flow rate controller located in each feed line. For slurry fuel feed lines, a signal from the flow recorder-controller is provided to a speed control for a positive displacement pump. For liquid or gaseous hydrocarbon fuel feed lines and for oxidant feed lines, the signal from the flow recorder-controller is provided to a flow control valve. Responsive to said signal(s), the speed of said pump(s) is varied, or alternatively the opening in said flow control valve(s) is changed. By this means, the flow rate for each stream of fuel passing through the burner may be adjusted up or down depending on whether it is being phased in or out.

The velocity of the reactant stream through the central conduit means or annular passage means is in the range of about 0.5–100, such as 10–50 feet per second, say 2–20 ft. per sec. at the face of the burner when said reactant stream is a liquid hydrocarbon fuel or liquid slurry of solid carbonaceous fuel, or mixtures thereof, and in the range of about 85 feet per second to sonic velocity, say 100–600 feet per second when said reactant stream is a gaseous hydrocarbon fuel or a free-oxygen containing gas with or without admixture with a temperature moderator or a temperature moderating gas. The velocity of a stream of reactant fuel or a stream of a mixture of reactant fuels exceeds the flame propagation velocity for that fuel or fuel mixture.

The term solid carbonaceous fuels, as used herein to describe suitable solid carbonaceous feedstocks, is intended to include various materials and mixtures thereof from the group consisting of coal, coke from coal, char from coal, coal liquefaction residues, petroleum coke, particulate carbon soot, and solids derived from oil shale, tar sands, and pitch. All types of coal may be used including anthracite, bituminous, sub-bituminous, and lignite. The particulate carbon may be that which is obtained as a by-product of the subject partial oxidation process, or that which is obtained by burning fossil fuels. The term solid carbonaceous fuel also includes by definition bits of garbage, dewatered sanitary sewage sludge, and semi-solid organic materials such as asphalt, rubber and rubber-like materials including rubber automobile tires which may be ground or pulverized to the proper particle size. Any suitable grinding system may be used to convert the solid carbonaceous fuels or mixtures thereof to the proper size.

The solid carbonaceous fuels are preferably ground to a particle size so that 100% of the material passes through an ASTM E 11-70 Sieve Designation Standard 1.4 mm (Alternative No. 14) and at least 80% passes through an ASTM E 11-70 Sieve Designation Standard 425 µm (Alternative No. 40).

The moisture content of the solid carbonaceous fuel particles is in the range of about 0 to 40 wt. %, such as 2 to 20 wt. %.

The term liquid carrier, as used herein as the suspending medium to produce pumpable slurries of solid carbonaceous fuels is intended to include various materials from the group consisting of water, liquid hydrocarbonaceous material, and mixtures thereof. However, water is the preferred carrier for the particles of solid carbonaceous fuel. In one embodiment, the liquid carrier is liquid carbon dioxide. In such case, the liquid slurry may comprise 40-70 wt. % of solid carbonaceous fuel and the remainder is liquid $CO_2$. The $CO_2$-solid fuel slurry may be introduced into the burner at a temperature in the range of about $-67°$ F. to $100°$ F. depending on the pressure.

The term liquid hydrocarbonaceous material as used herein to describe suitable liquid carriers and fuels is intended to include various liquid hydrocarbon materials, such as those selected from the group consisting of liquefied petroleum gas, petroleum distillates and residues, gasoline, naphtha, kerosine, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operation, furfural extract of coker gas oil and mixtures thereof.

The term liquid hydrocarbonaceous material as used herein to describe suitable liquid fuels is also intended to include various oxygen containing liquid hydrocarbonaceous organic materials, such as those selected from the group consisting of carbohydrates, cellulosic materials, aldehydes, organic acids, alcohols, ketones, oxygenated fuel oil, waste liquids and by-products from chemical processes for producing oxygenated hydrocarbonaceous organic materials, and mixtures thereof.

For example in one embodiment, the feedstream comprises a slurry of liquid hydrocarbonaceous material and solid carbonaceous fuel. $H_2O$ in liquid phase may be mixed with the liquid hydrocarbonaceous carrier, for example as an emulsion. A portion of the $H_2O$ i.e., about 0 to 25 weight % of the total amount of $H_2O$ present may be introduced as steam in admixture with the free-oxygen containing gas. The weight ratio of $H_2O$/fuel may be in the range of about 0 to 5, say about 0.1 to 3.

The term gaseous hydrocarbonaceous material as used herein to describe suitable gaseous hydrocarbonaceous fuels is intended to include a gaseous feedstock from the group consisting of ethane, propane, butane, pentane, methane, natural gas, coke-oven gas, refinery gas, acetylene tail gas, ethylene off-gas, and mixtures thereof.

Simultaneously with the fuel stream(s), a free-oxygen containing gas stream is supplied by way of a free passage(s) in the burner. The free-oxygen containing gas may be passed through the central and/or annular conduits at a temperature in the range of about ambient to 1500° F., and preferably in the range of about ambient to 300° F., for oxygen-enriched air, and about 500° to 1200° F., for air, and a pressure in the range of above about 1 to 300 atmospheres, such as 5 to 250 atmospheres, say 10 to 100 atmospheres. The atoms of free-oxygen plus atoms of organically combined oxygen in the solid carbonaceous fuel per atom of carbon in the solid carbonaceous fuel (O/C atomic ratio) may be in the range of 0.5 to 1.95. With free-oxygen containing gas in the reaction zone the broad range of said O/C atomic ratio may be about 0.5 to 1.7, such as about 0.7 to 1.4. More specifically, with air feed to the reaction zone, said O/C atomic ratio may be about 0.7 to 1.6, such as about 0.9 to 1.4.

The term free-oxygen containing gas, as used herein is intended to include air, oxygen-enriched air, i.e., greater than 21 mole % oxygen, and substantially pure oxygen, i.e., greater than 95 mole % oxygen, (the remainder comprising $N_2$ and rare gases).

The free-oxygen containing gas may be supplied with or without mixture with a temperature moderating gas. The term temperature moderator or temperature moderating gas as employed herein is intended to include by definition a member of the group consisting of $H_2O$, $CO_2$, $N_2$, a recycle portion of the cooled and cleaned effluent gas stream from the gas generator, and mixtures thereof. When supplemental steam is employed as a temperature moderator, all of the steam may be passed through one passageway. Alternatively, about 0 to 25 volume percent of the steam may be mixed with the stream of free-oxygen containing gas and passed through one passageway, and the remainder of the steam may be passed through the remaining passageway.

The subject single and multi-annulus pre-mix burners may be operated with the feedstreams passing through alternate passages in the burner. Typical modes of operation are summarized in Tables I to III below.

Table I lists the materials being introduced into the gasifier by way of the burner and their corresponding symbol. The solid carbonaceous fuel (B), water (C), and liquid hydrocarbonaceous material (E) may be mixed together in various combinations upstream from the burner inlet to produce a pumpable slurry which may be introduced into the burner and then passed through one of the several free-flow passages of the burner as shown in Table II for the single annulus pre-mix burner (see FIGS. 1 and 2); and as shown in Table III for the double annulus pre-mix burner (see FIG. 3). For example, the first entry in Table II shows that a pumpable slurry stream comprising solid carbonaceous fuel (B) in admixture with water (C) may be passed through the retracted central conduit 15 of a single annulus pre-mix burner i.e. FIGS. 1 and 2 while simultaneously a stream of free-oxygen containing gas may be passed through annular passage 17.

Other modes of operation of the subject invention are possible in addition to those shown in Tables II and III.

With respect to the operation of a double annulus embodiment of the burner shown in FIG. 3, the second entry of Table III shows that free-oxygen containing gas (A) may be passed through both annular passages. In such case, any member of the following group may be simultaneously passed through one or both annular passages 17 and 51: air, oxygen-enriched air, and substantially pure oxygen. Also, as shown in the seventh entry in Table III, free-oxygen containing gas (A) in admixture with steam (D) (say up to 25 vol. % of the total amount of H₂O) may be passed through the central conduit 15 and the remainder of the H₂O as water (C) may be passed through the intermediate annulus 17 as part of the liquid carrier for the slurry.

When the liquid carrier for the slurry of solid carbonaceous fuel is a liquid hydrocarbonaceous material premature combustion within the burner may be avoided by one or more of the following:

(1) keeping the fuel below its autoignition temperature, (2) including water in the solid fuel slurry, (3) using air or air enriched with oxygen i.e. up to about 40 vol. % $O_2$, (4) mixing steam with the air, (5) employing a double annulus pre-mix burner (FIG. 3) in which the tip of the intermediate exit nozzle has about 0 retraction from the face of the burner. In such case, the free-oxygen containing gas such as substantially pure oxygen may be separately passed through the outer annular passage of the burner and into the reaction zone of the gas generator where it reacts by partial oxidation with the multiphase mixture discharged from the pre-mix zone of the burner, and (6) discharging the multiphase mixture at the exit orifice at the tip of the burner with a discharge velocity which is greater than the flame propagation velocity.

TABLE I

| Material | Symbol |
| --- | --- |
| Free-Oxygen Containing Gas | A |
| Solid Carbonaceous Fuel | B |
| Water | C |
| Steam | D |
| Liquid Hydrocarbonaceous Material | E |
| Temperature Moderating Gas | F |

TABLE II

SINGLE ANNULUS PRE-MIX BURNER
(See FIGS. 1 and 2)

| Central Conduit Means 15 | Annular Passage Means 17 |
| --- | --- |
| B + C | A |
| B + C + E | A |
| B + C | A + D |
| A | B + C |
| A | B + C + E |
| A + D | B + E |

TABLE III

DOUBLE ANNULUS PRE-MIX BURNER
(See FIG. 3)

| Central Conduit 15 | Intermediate Annulus 17 | Outer Annulus 51 |
| --- | --- | --- |
| A | B + C | A |
| B + C | A | A |
| B + C | A | F |
| A | B + C + E | A |
| A | B + C + E | A + D |
| D | B + C + E | A |
| A + D | B + C + E | A |
| B + C + E | A | A |
| B + C + E | D | A |
| B + C + E | A | D |
| A | B + E | A + D |
| A + D | B + E | A |
| A + D | B + E | A + D |
| D | B + E | A |
| A | B + E | D |
| B + E | A + D | A + D |
| B + E | A | A + D |

TABLE III-continued

DOUBLE ANNULUS PRE-MIX BURNER
(See FIG. 3)

| Central Conduit 15 | Intermediate Annulus 17 | Outer Annulus 51 |
| --- | --- | --- |
| B + E | D | A |
| B + E | A | D |
| A | B + E | F |
| F | B + C | A |
| A | B + C | F |
| E | B + C | A |
| B + C | E | A |

The subject burner assembly is inserted downward through a top inlet port of a compact unpacked free-flow noncatalytic refractory lined synthesis gas generator, for example as shown in FIG. 1. The burner extends along the central longitudinal axis of the gas generator with the downstream end discharging a multiphase mixture of fuel, free-oxygen containing gas, and temperature moderator directly into the reaction zone.

The relative proportions of solid or solid and liquid fuel, water and oxygen in the feedstream to the gas generator are carefully regulated to convert a substantial portion of the carbon in the fuel e.g., up to about 90% or more by weight, to carbon oxides; and to maintain an autogenous reaction zone temperature in the range of about 1700° to 3500° F., preferably in the range of 2000° to 2800° F.

The dwell time in the reaction zone is in the range of about 1 to 10 seconds, and preferably in the range of about 2 to 8. With substantially pure oxygen feed to the gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S+COS$ 0 to 5, $N_2$ nil to 5, and $A_r$ nil to 1.5. With air feed to the gas generator, the composition of the generator effluent gas in mole % dry basis may be about as follows: $H_2$ 2 to 20, CO 5 to 35, $CO_2$ 5 to 25, $CH_4$ 0 to 2, $H_2S+COS$ 0 to 3, $N_2$ 45 to 80, and $A_r$ 0.5 to 1.5. Unconverted carbon and ash are contained in the effluent gas stream.

The hot gaseous effluent stream from the reaction zone of the synthesis gas generator is quickly cooled below the reaction temperature to a temperature in the range of about 250° to 700° F. by direct quenching in water, or by indirect heat exchange for example with water to produce steam in a gas cooler. The gas stream may be cleaned and purified by conventional methods.

DESCRIPTION OF THE DRAWING

A more complete understanding of the invention may be had by reference to the accompanying schematic drawing which shows the subject invention in detail. Although the drawing illustrates preferred embodiments of the invention, it is not intended to limit the subject invention to the particular apparatus or materials described.

Referring to the figures in the drawing, FIG. 1 is a schematic representation of one embodiment of the invention showing control means for the continuous operation of a synthesis gas generator while phasing out one fuel and simultaneously phasing in another without depressurizing the gas generator. Further, the control means may be used for rapidly changing throughput levels-up or down over the flow range for which the burner shown is designed. By this means adjustments may be made to control the amount of raw effluent gas produced, and to provide for a change in demand for the product gas. Further, another use for the control system is to maintain the desired composition of the product gas when possible to do so by adjustments to the flow rates of one or more of the reactant streams. Thus, by the subject flow control system, the flow rates for all of the reactant streams are separately and independently controlled so that the temperature and weight ratio of $H_2O$ to fuel in the reaction zone are maintained at design conditions and within desired operating ranges for the fuel being reacted. If necessary the atomic ratio of free-oxygen to carbon in the fuel in the reaction zone may also be controlled within design conditions.

While the control system shown in FIG. 1 is specifically designed for the combination of feedstocks comprising a solid carbonaceous fuel slurry and a liquid hydrocarbonaceous fuel, by simple modifications to the means for changing the flow rate of the fuel stream as described below, the system may be used to control other combinations of solid carbonaceous fuel slurries, and liquid, or gaseous hydrocarbonaceous fuels.

In FIG. 1, burner 1 is mounted in central flanged inlet 30 which is located in the upper head of conventional refractory lined free-flow synthesis gas generator 41 along the central longitudinal axis. The reactant streams enter through the upstream end of burner 1, pass downward therethrough, and are discharged through downstream end 42. Burner 1 is designed so that the required system output for steady-state operation may be achieved or even exceeded by a specified amount when the flow rate through all passages is a maximum. The control system can independently change the flow rate of any one or more of the feedstreams in lines 181, 161, 43 and 63. By this means the temperature in the reaction zone 31 is maintained at the desired operating temperature. Further, the weight ratio $H_2O$ to fuel, and if necessary the atomic ratio of free-oxygen to carbon in the fuel in the reaction zone may be maintained at design conditions.

Operation of the process and control system shown in FIG. 1 follows. For purposes of illustration, the principal fuel may be for example a solid carbonaceous fuel slurry i.e. coal-water or coal-oil slurry in line 43. The stand-by fuel is a liquid hydrocarbonaceous fuel i.e. residual oil in line 161. Of course, the principal fuel may have been chosen to be any liquid or gaseous hydrocarbonaceous fuel.

In the subject process, the remaining portions of the principal fuel stream being phased out of line 50 is mixed in line 14 with the stand-by fuel stream being phased into line 167. $H_2O$ may be in admixture with the fuels in lines 161 and 43 or the free-oxygen containing gas in line 63. Alternatively, as shown in FIG. 1, at least a portion i.e. 10-100 vol. % of the $H_2O$ may be provided as the temperature moderator, for example steam. Thus, as shown in FIG. 1, steam in line 187 preferably may be mixed in line 18 with the free-oxygen containing gas flowing in line 70. By this scheme, controlled amounts of steam may be introduced into and mixed with the stream of free-oxygen containing gas and/or fuel upstream from the burner.

Valves 183, 163, 77, and 65 may be manually or automatically operated to obtain a wide open position to a completely closed position. The rates that each valve may be opened and closed is also controllable. The slurry feedstream in line 43 is pumped into the reaction zone 31 of synthesis gas generator 41 by way of positive displacement pump 45 equipped with speed control 46, line 47, flow measurer and transmitter 48, line 49, valve 77, lines 50 and 14, and inlet 8 of burner 1. The slurry flow rate through line 43 is controlled by the speed of positive displacement pump 45. In order to phase out the slurry flowing through line 43, this speed is continuously decreased from maximum to zero over a period in the range of about 1 to 3600 seconds, such as about 60 to 1800 seconds, say about 300 to 1000 seconds. Flow recorder-controller with transmitter 51 includes a microcomputer means which is programmed with the desired time vs. decreasing flow rate curve. The rate of slurry flow in line 47 is measured and a signal a is provided by flow transmitter 48 corresponding to the flow rate of the slurry in line 43. Flow recorder-controller 51 receives signal a, compares it with a signal representing the desired flow rate for that moment, and provides a corresponding adjustment signal to speed control 46 to adjust the speed of pump 45 downward so that the charge slurry flowing in line 49 assumes a given decreased flow rate for that moment in the phase-out period. The new slurry rate is measured and the cycle is repeated. By this means, repeated adjustments to the rate of flow are made and the slurry flowing in line 50 is phased out.

Simultaneously with the phasing out of the principal slurry fuel flowing in line 43, the stand-by liquid hydrocarbonaceous fuel flowing in line 161 is phased in over the same period of time. Flow recorder-controller with transmitter 171 includes a microcomputer means which is programmed with the desired time vs. increasing flow rate curve. The rate of oil flow in line 161 is measured and a signal m is provided by flow transmitter 165 corresponding to the flow rate of the oil in line 161. Flow recorder-controller 171 receives signal m, compares it with a signal representing the desired flow rate for that moment and provides a corresponding adjustment signal to valve 163 to open wider so that the charge oil in line 166 assumes a given increased flow rate for that moment in the phase-in period. The new oil rate is measured and the cycle is repeated. By this means, repeated adjustments to the rates of flow of the principal and stand-by fuels may be made so that the oil flowing in line 167 may be phased into line 14 in an amount that compensates for the reduced amount of solid carbonaceous fuel slurry flowing in line 50.

During or following the period that the portion of principal solid carbonaceous slurry fuel from line 43 is phased out and the portion of stand-by liquid hydrocarbon fuel from line 161 is phased in, the weight ratio of $H_2O$ to fuel in the reaction zone may be controlled at design conditions or maintained substantially constant i.e. less than $\pm 10\%$ variation, by increasing or decreasing the flow rate of the temperature moderator. Accordingly in the subject example, simultaneously with the phase-out of the coal-water slurry a supplemental amount of $H_2O$ from an external source may be phased in over the same period of time. Thus, in FIG. 1, a portion of the steam in line 181 is passed through line 187 and phased into line 18 where it mixes with the free-oxygen containing gas from line 70. Flow recorder-controller with transmitter 191 includes a microcomputer means which is programmed with the desired time vs. increasing flow rate curve.

The rate of steam flow in line 181 is measured and a signal s is provided by flow transmitter 185 corresponding to the flow rate of the steam in line 181. Flow recorder-controller 191 receives signal s, compares it with a signal representing the desired flow rate for that moment and provides a corresponding adjustment signal to valve 183 to open wider so that the charge steam in line 186 assumes a given increased flow rate for that moment in the phase-in period. The new steam rate is measured and the cycle is repeated. By this means, repeated adjustments to the rate of steam flow are made and the steam flowing in line 187 is phased into line 18 in an amount that will maintain the weight ratio of $H_2O$ to fuel in the reaction zone at design conditions, for example substantially constant. In another embodiment the weight ratio $H_2O$/fuel in the reaction zone is adjusted up or down by controlling the steam rate as described previously in order to obtain a desired temperature in the reaction zone and composition of the product gas.

Simultaneously with or after the phasing out of the principal fuel, the phasing in of the stand-by fuel, and optionaly with or without the phasing in or out of the steam depending on the nature of the fuels, the free-oxygen containing gas may be adjusted up or down. By this means the temperature in the reaction zone may be controlled at design conditions, or maintained substantially constant i.e. less than $\pm 200°$ F. variation. Thus, in the present example in FIG. 1, a portion of the free-oxygen containing gas in line 63 is passed through line 70 and phased into line 18 where it mixes with the steam, if any, from line 187 as previously described. Flow controller 74 is programmed with the desired time vs. flow rate curve. The period of adjustment is the same as that for the fuel and steam streams. The adjustment to the oxygen flow rate may be up or down depending on the nature of the fuel streams and the addition of steam, if any. In the subject example, the oxygen flow rate will be increased to satisfy the additional requirements for the partial oxidation of a liquid hydrocarbon in comparison with a solid carbonaceous fuel.

The rate of free-oxygen containing gas in line 63 is measured and a signal b is provided by flow transmitter 67 corresponding to the flow rate of the free-oxygen containing gas in line 63. Flow recorder-controller with transmitter 74 includes a microcomputer means which receives signal b, compares it with a signal representing the desired flow rate for that moment, and provides a corresponding adjustment signal to valve 65 to open wider so that the charge free-oxygen containing gas in line 68 assumes a given increased flow rate for that moment in the phase-in period. The new free-oxygen containing gas rate is measured and the cycle is repeated. By this means repeated adjustments to the rate of oxygen flow are made and the free-oxygen containing gas flowing in line 70 is phased into line 18 in an amount that will maintain the temperature in the reaction zone at design conditions or substantially constant. In one embodiment in which the burner shown in FIG. 3 is employed, a portion of the temperature moderator, for example steam in line 187, is passed through inlet 13 of the burner.

In another embodiment, the free-oxygen containing gas rate is adjusted up or down to obtain a desired temperature in the reaction zone and composition of the product gas. Alternatively, by the previously described means, the atomic ratio of oxygen to carbon in the reaction zone may be controlled at design conditions i.e. in the range of about 0.5 to 1.7.

The previously mentioned time vs. flow rate curves for programming conventional flow recorder-controllers 191, 171, 51, and 74 may be determined by conventional calculations based on heat and weight balances for the entire system.

In another embodiment, the parameters for said calculations and any others may be measured by conventional detectors and the signals responsive thereto may be fed to an overall control system means 40. The input to system control means 40 may be manual or a signal from a computer, analyzer, or sensor. Control means 40 comprises conventional circuits and components for providing or converting signals i.e. pneumatic or electronic to operate said speed controls and valves.

In control means 40, the computer calculated values or the manually inserted set points for the desired rates of flow at specific moments for the various streams are compared respectively with the signals a, m, s and b. For example, responsive to signal a, control means 40 may automatically control pump speed control 46 by sending signal c to flow-recorder-controller 51. Alternatively, signal c may be fed directly to speed control 46. In another embodiment, for example flow recorder-controller 51 may receive signal a from flow transmitter 48 and signal c from control means 40 and compute the speed adjustment signal for the operation of speed control 46. In still another embodiment, the flow of the feedstream may be stopped by a signal i from control means 40 to valve 77.

Similarly, responsive to signal m, control means 40 may automatically control liquid hydrocarbonaceous fuel valve 163 by sending signal w to flow-recorder-controller 171.

In a similar manner, responsive to signal s, control means 40 may automatically control steam valve 183 by sending signal u to flow-recorder-controller 191.

Also, similarly, responsive to signal b, control means 40 may automatically control free-oxygen containing gas valve 65 by sending signal j to flow-recorder-controller 74.

Two suitable burners for use in the subject process and control system are shown in FIGS. 1-3. Corresponding parts of the burner shown in FIGS. 1 and 2 have the same reference number.

Burner 1 is shown in greater detail in FIG. 2 and substantially comprises unobstructed inner coaxial retracted central conduit means 15 and outer concentric coaxial conduit 16 which is disposed longitudinally about inner central conduit means 15. Disc flange 10 is attached to the outside circumference of outer coaxial conduit 16 and supports burner 1 in a vertical longitudinal direction. The central longitudinal axes of burner 1 and gasifier 41 are coaxial. Spacing means 18 provide a free-flow annular passage means 17 between the outside diameter of central cylindrical conduit means 15 and the inside diameter of outer cylindrical conduit 16. Exit orifice 20 at the downstream tip of central conduit 15, is preferably straight, circular in cross-section, and perpendicular to the longitudinal axis of the burner. Alternatively, exit orifice 20 may be converging or diverging. Outer conduit 16 terminates at the downstream end of the burner with converging nozzle 21. A vertical cross-section of exit orifice 21 may be frusto-conically shaped, which may or may not merge into a right cylinder. Preferably for wear resistance, as shown in FIG. 2, nozzle 21 comprises a frusto-conical rear portion 22 that develops into a right cylindrical front portion 23 which terminates at the downstream face 6 of the burner. The cylindrical exit section will permit: (1) additional burner life because of increased surface available for abrasion, and (2) fabrication of a ceramic or refractory insert or an entire cooling chamber from a thermal and abrasion resistant material i.e., tungsten or silicon carbide in order to reduce damage and to extend burner life.

The height of the front cylindrical portion 23 of exit nozzle 21 is in the range of about 0 to 1.5, say about 0.1 to 1.0 times, its own diameter i.e. the minimum diameter of converging nozzle 21. The diameter of exit orifice 20 of central conduit 15 is in the range of about 0.2 to 1.5, say about 0.5 to 0.8 times the minimum diameter of converging nozzle 21.

The downstream end of the burner may or may not be cooled. Preferably, as shown in FIG. 2, coaxial annular shaped cooling chamber 2 surrounds exit orifice 21 at the burner tip. By passing water through cored section 24 of cooling chamber 2, the tip of burner 1 may be prevented from overheating. Optionally for similar reasons, outer conduit 16 may be kept cool by passing water through coils 4 which encircle the outside surface of outer conduit 16 along its length. Suitable converging angles for orifice 21 are in the range from about 15° to 90° from the central longitudinal axis of the burner. The downstream tip of exit orifice 20 of central conduit means 15 is severely retracted upstream from face 6 of burner 1 a distance of two or more times the minimum diameter of converging exit nozzle 21. For example, the setback of tip 20 of central conduit 15 from burner face 6 may be in the range of about 3 to 10 times the minimum diameter of converging exit nozzle 21. The space between tip 20 of central conduit 15 and burner face 6 constitutes the unobstructed pre-mix zone.

In the operation of burner 1, either reactant stream i.e. see Table II supra, may enter burner 1 by way of inlet 9 of FIG. 1 and pass directly from the upstream portion down through free-flow central conduit 15, through exit orifice 20, and into pre-mix zone 25, as shown in FIG. 2. Cover plate 11 seals off the upper end of annular passage means 17. The upstream inlet end 9 of central conduit 15 is coupled to a feed line and the downstream end passes through cover plate 11 and is sealed thereto. Simultaneously, the other reactant stream may enter burner 1 by way of inlet 8 and pass directly from the upstream portion 30 of outer conduit 16 down through free-flow annular passage 17 and into pre-mix zone 25 where intimate mixing of the two reactant streams takes place. Inlet 8 may or may not be tangential to outer conduit 16. Further, direct heat exchange between the two reactant streams takes place in pre-mix zone 25. The temperature in the pre-mix zone is controlled so that a controlled amount of the liquid carrier may be vaporized without burning i.e. from 0 to 100 vol. % say about 2 to 80 vol. %. Temperature control in the pre-mix zone may be effected by controlling such factors as dwell time and heat content of the entering streams, and amount of external cooling such as by coils 4, if any. Pre-mix zone 25 is substantially free from any obstruction to the free-flow of the materials passing therethrough.

In the burner shown in FIGS. 1 and 2, streams of different materials flowing down through coaxial retracted central conduit 15 and simultaneously down through annular passage 17 are successively mixed together in tandem pre-mix chambers 25 and 40′. While the pre-mix zone in this embodiment is shown as comprising two separate coaxial pre-mix chambers 25 and 40′ in series, the pre-mix zone for other embodiments of the subject invention may actually comprise one or more, such as 2 to 5 coaxial pre-mix chambers. For example, three pre-mix chambers 25, 40′, and 41 are included in the embodiment of the burner shown in FIG. 3. Each pre-mix chamber in FIGS. 1, 2 and 3, except for the first chamber in the line, comprises a coaxial cylindrical body portion 45 followed by a coaxial at least partially converging outlet portion 22 or 46 in FIG. 3 that may optionally develop into a straight cylindrical portion 23 or 49, respectively. Optionally, such outlets may be made from a thermal and wear resistant material i.e. silicon or tungsten carbide, such as previously described. In embodiments having a plurality of pre-mix chambers, the first pre-mix chamber in the line may have a straight coaxial cylindrical body portion 47, that discharges through circular orifice 39 directly into the next in line coaxial pre-mix chamber 40′. Alternatively, one or more of the pre-mix chambers may be a converging frusto-conical shaped section. Preferably, the mixture leaving one pre-mix chamber expands into the next successive pre-mix chamber. When the mixture is accelerated and expanded through a final exit nozzle at the tip of the burner into the combustion chamber, a more stable and efficient combustion pattern results. The temperature, pressure and velocity ranges for the streams of materials passing through the various passages of the burner are substantially the same as those discussed previously. The inlet to the first pre-mix chamber 25 may have a converging inlet 48 as shown in FIGS. 1, 2 and 3.

FIG. 3 is a vertical sectional view of an embodiment of the retracted central conduit 15 pre-mix burner similar to burner 1, as shown in FIG. 2, but modified to provide two coaxial annular passages i.e. intermediate annular passage 17 and outer annular passage 51. Further, the pre-mix zone comprises three successive free-flow coaxial pre-mix chambers 25, 40′, and 41. By spacing means 18, concentric coaxial outer conduit 52, retracted coaxial intermediate conduit 53, and retracted coaxial central conduit 15 may be radially spaced from each other to provide said separate annular passages and pre-mix chambers with substantially no obstruction to the free-flow of materials therethrough. The downstream tip 20 of central conduit 15 is retracted upstream from face 6 of the burner a distance in the range of 2 or more, say 3 to 10 times the minimum diameter of converging exit orifice 21. The downstream tip 54 of intermediate conduit 53 is retracted upstream from face 6 of the burner a distance in the range of 0 to 12, say 1 to 5 times the minimum diameter of converging exit orifice 21.

Central conduit 15, and annular passages 17 and 51 of the burner in FIG. 3 are respectively connected upstream to separate inlets in a manner similar to that shown in FIG. 2. Thus, the upstream inlet end 9 of inlet pipe 9 of central conduit 15 is coupled to a feed line and the downstream end passes through cover plate 12 and is sealed thereto. Cover plate 12 seals off the upper ends of annular passages 51 and 17. Simultaneously, the other feedstreams may enter burner 1 by way of upstream inlet 8 that leads into annular passage 17, and upstream inlet 13 which leads into annular passage 51. Optionally, annular disc 56, with or without a plurality of small diameter holes 57, may close off the downstream end of annular passage 51. Inlets 8 and 13 may or may not be tangential to coaxial intermediate conduit 53 and outer conduit 52, respectively. The burner tip may be cooled by passing water through cored section 24 of annular cooling chamber 2 which is coaxial with the central longitudinal axis of the burner at the downstream end in the manner shown. Alternatively, cooling chamber 2 may be eliminated. Cooling coils 4 may encircle the burner along its length.

In the operation of the embodiment of the burner shown in FIG. 3, the feedstreams simultaneously passing down through central conduit 15 and intermediate annular passage 17 at different velocities impinge and mix with each other in the first pre-mix chamber 25. The impingement of one reactant stream, such as the liquid slurry of solid carbonaceous fuel in a liquid medium with another reactant stream, such as a gaseous stream of free-oxygen containing gas, steam, or temperature moderator at a higher velocity causes the liquid slurry to break up into a fine spray. The multiphase mixture then passes into the second pre-mix chamber 40' for additional mixing. Leaving chamber 40' by way of converging exit nozzle 46 and circular orifice 54 at the downstream tip of chamber 40', the multiphase mixture passes into the third pre-mix chamber 41. The third feedstream enters the burner upstream through a separate inlet 13, and passes down outer annular passage 51. Optionally, at least a portion of the third feedstream in annular passage 51 may be mixed with the other feedstreams in annular passage 17 and pre-mix chamber 25, 40', and 41 by being passed through a plurality of rings of small diameter passages or holes 60, 61, 62 and 57 located in the wall of intermediate conduit 53 and annular disc 56. When the set back of orifice 54 at the tip of intermediate conduit 53 from face 6 of the burner is greater than 0, say in the range of about 1.0 to 5 times the minimum diameter of exit orifice 21, then the third feedstream may mix with the first and second feedstreams in pre-mix chamber 41 to produce a multiphase mixture. Further, in such embodiment, there may be 2 or more say 2 to 5 cylindrical coaxial pre-mix chambers in series. The multiphase mixture passes through converging nozzle 21 at the downstream tip of the burner into the reaction zone of the gas generator.

In the embodiment of the burner shown in FIG. 3 with a set back of orifice 54 of about 0, the third feedstream passing through outer annular passage 51 will contact and mix with the multiphase mixture of the other two feedstreams from the pre-mix zone downstream from face 6 of the burner, say about 1 to 24 inches. Further, in such embodiment, there may be one or more say 2 to 5 cylindrical coaxial pre-mix chambers in series. For example, the stream of free-oxygen containing gas may be passed through either central conduit 15 or intermediate passage 17 and the fuel feedstream may be passed through the other passage i.e. the central conduit or intermediate passage whichever is free. Simultaneously, a stream of temperature moderator may be passed through the outer annulus passage 51.

Although modifications and variations of the invention may be made without departing from the spirit and scope thereof, only such limitations should be imposed as are indicated in the appended claims.

We claim:

1. In a process for producing gaseous mixtures comprising $H_2$, $CO$, $CO_2$, entrained particulate carbon, and at least one material from the group consisting of $H_2O$, $N_2$, $H_2S$, $COS$, $CH_4$, $Ar$, and ash in a free-flow noncatalytic partial oxidation gas generator, the improvement employing a burner comprising a central conduit radially spaced from a concentric coaxial outer conduit and a free-flow coaxial annular passage therebetween, and changing from one reactant feedstream to another without shutting down or depressurizing the system comprising the steps of:

(1) passing a first reactant stream of liquid hydrocarbonaceous fuel with or without mixture with a temperature moderator through the annular passage of said burner; wherein said burner comprises said central conduit coaxial with the central longitudinal axis of said burner and having a downstream exit orifice that discharges into a pre-mix zone, said central conduit providing a passage, said outer coaxial conduit providing said annular passage along the length of said central conduit between the inside diameter of said outer conduit and the outside diameter of said central conduit, an exit nozzle coaxial with and terminating said outer conduit at the downstream end of said burner, comprising a converging frusto-conical rear portion and a right cylindrical front portion, an annular shaped face-cooling chamber surrounding said exit nozzle at the burner tip, and wherein the tip of said central conduit is retracted upstream from the face of said burner a distance of two or more times the minimum diameter of said outer conduit converging exit nozzle to provide a pre-mix zone comprising one or more cylindrically shaped communicating pre-mix chambers in tandem and coaxial with the central longitudinal axis of said burner;

(2) simultaneously passing a separate reactant stream of free-oxygen containing gas with or without mixture with a temperature moderator through the central conduit in said burner;

(3) mixing together said reactant streams from (1) and (2) in said pre-mix zone to produce a well-distributed mixture, and reacting said mixture by partial oxidation in the reaction zone of said gas generator at an autogenous temperature in the range of about 1700° to 3500° F., a pressure in the range of about 1 to 300 atmospheres, an atomic ratio of oxygen/carbon in the range of about 0.5 to 1.7, and a weight ratio $H_2O$/fuel in the range of about 0.1 to 3.0;

(4) phasing out of the fluid passage in which it is flowing in said burner said stream of liquid hydrocarbonaceous fuel with or without mixture with a temperature moderator, said phasing out being with a uniformly decreasing rate of flow that varies from maximum to 0 over a period of time in the range of about 1–3600 seconds; and simultaneously phasing a pumpable slurry stream of solid carbonaceous fuel in a liquid carrier in liquid phase and having a solids content in the range of about 30 to 75 wt. % in said burner at a-, uniformly increasing rate of flow that varies from 0 to maximum over the same period of time and mixing with the remaining portion of and replacing the phased out portion of said stream of liquid hydrocarbonaceous fuel with or without mixture with a temperature moderator flowing therein; and (5) adjusting up or down the flow rate of the reactant stream of free-oxygen containing gas with or without mixture with a temperature moderator passing through the burner and if necessary phasing in or out supplemental $H_2O$ into the reaction zone, so as to adjust the free oxygen/carbon atomic ratio and the weight ratio $H_2O$/fuel in the reaction zone to design conditions for the partial oxidation reaction.

2. The process of claim 1 where in step (5) the temperature in the reaction zone is maintained substantially constant and the weight ratio $H_2O$/fuel is maintained in the range of about 0.1 to 3.0.

3. The process of claim 1, where the downstream tip of said central conduit is retracted upstream from the face of said burner a distance of about 3 to 10 times the minimum diameter of the outer conduit means downstream exit orifice to provide a pre-mix zone.

4. The process of claim 3 wherein said pre-mix zone comprises 2 to 5 coaxial cylindrical shaped pre-mix chambers in series.

5. The process of claim 4 wherein each pre-mix chamber except the first chamber comprises a coaxial cylindrical body portion followed by a coaxial at least partially converging outlet portion, and said first pre-mix chamber comprises a straight coaxial cylindrical body portion that discharges directly into the next in line coaxial pre-mix chamber.

6. A method for controlling a partial oxidation process in which one reactant fuel stream is replaced by another without shutting down or depressurizing the system comprising:

(1) separately sensing the flow rates of four feedstreams 1–4 respectively consisting of steam, stand-by fuel, principal fuel, and free-oxygen containing gas, and providing signals s, m, a, and b corresponding respectively to the actual flow rates of feedstreams 1–4 to a control unit; and wherein said principal fuel comprises a pumpable slurry feed stream of solid carbonaceous fuel in a liquid carrier in liquid phase and having a solids content in the range of about 30 to 75 wt. % and said standby fuel comprises a liquid hydrocarbonaceous fuel stream;

(2) comparing said actual flow rate signals s, m, a, and b respectively with manual or automatically computed and inserted input signals representing the desired flow rate or set point for that moment for each of the four feedstreams, and providing a corresponding adjustment signal to a flow rate control means for controlling the flow rate of each feedstream 1–4 in accordance with the respective set point of each;

(3) passing a feedstream of said principal fuel into the reaction zone of a free flow noncatalytic partial oxidation gas generator, by way of a free flow annular passage of a burner comprising a central conduit coaxial with the central longitudinal axis of said burner and having a downstream exit orifice that discharges into a premix zone, said central conduit providing passage, an outer coaxial conduit providing said free-flow annular passage along the length of said central conduit between the inside diameter of said outer conduit and the outside diameter of said central conduit, an exit nozzle terminating said outer conduit at the downstream end of said burner comprising a converging frustoconical rear portion and a right cylindrical front portion which terminates at the downstream face of the burner, an annular shaped face-cooling chamber surrounding said exit nozzle at the burner tip, and wherein the tip of said central conduit is retracted upstream from the face of said burner a distance of two or more times the minimum diameter of said outer conduit converging exit nozzle to provide said pre-mix zone comprising one or more cylindrically shaped communicating pre-mix chambers in tandem and coaxial with the central longitudinal axis of said burner;

(4) simultaneously passing a separate feedstream of free-oxygen containing gas with or without mixture with a separate feedstream of steam through the central conduit in said burner;

(5) mixing together said reactant streams from (3) and (4) in said pre-mix zone to produce a well-distributed, mixture and reacting said mixture by partial oxidation in the reaction zone of said gas generator at an autogenous temperature in the range of about 1700° to 3500°, a pressure in the range of about 1 to 300 atmospheres, an atomic ratio of oxygen/carbon in the range of about 0.5 to 1.7, and a weight ratio $H_2O$/fuel in the range of about 0.1 to 3.0;

(6) replacing in said annular passage said feedstream of principal fuel with a replacement feedstream of stand-by fuel by phasing out of the fluid passage means in which it is flowing said stream of principal fuel, said phasing out being with a uniformly decreasing rate of flow that varies from maximum to 0 over a period of time in the range of about 1–3600 seconds; and simultaneously phasing said stream of stand-by fuel into the same fluid passage at a uniformly increasing rate of flow that varies from 0 to maximum rate over the same period of time and mixing with the remaining portion of and replacing the phased out portion of said stream of principal fuel; and simultaneously with or after the completion of said replacement of feedstreams;

(7) adjusting the flow rate of the feedstream of free-oxygen containing gas passing through the burner, and if necessary introducing supplemental $H_2O$ into the reaction zone so as to adjust the free oxygen/carbon atomic ratio and the weight ratio $H_2O$/fuel in the reaction zone to design conditions for the partial oxidation reaction.

7. The method of claim 6 wherein said process feedstreams of stand-by fuel and/or principal fuel may be in admixture with $H_2O$ and/or said process feedstream of free-oxygen containing gas may be in admixture with a temperature moderating gas selected from the group consisting of $H_2O$, $CO_2$, $N_2$, cooled and cleaned effluent gas from the gas generator, and mixtures thereof.

8. The process of claims 1 or 6 in which said pumpable slurry of a solid carbonaceous fuel includes a liquid carrier selected from the group consisting of water, liquid hydrocarbon fuel, and mixtures thereof.

9. The process of claim 8 wherein said solid carbonaceous fuel is selected from the group consisting of coal, lignite, coke from coal, char from coal, coal liquefaction residues, particulate carbon, petroleum coke, solids derived from oil shale, tar sands and pitch, concentrated sewer sludge, bits of garbage, rubber, and mixtures thereof.

10. The process of claims 1 or 6 in which said liquid hydrocarbonaceous fuel is a liquid hydrocarbon selected from the group consisting of liquefied petroleum gas, petroleum distillates and residua, gasoline, naphtha, kerosine, crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

11. The process of claims 1 or 6 in which said liquid hydrocarbonaceous fuel is an oxygenated hydrocarbonaceous organic material from the group consisting of carbohydrates, cellulosic materials, aldehydes, organic acids, alcohols, ketones, oxygenated fuel oil, waste liquids and by-products from chemical processes for oxygenated hydrocarbonaceous organic materials, and mixtures thereof.

12. The process of claims 1 or 6 in which said free-oxygen containing gas is selected from the group consisting of air, oxygen-enriched-air i.e. greater than 21 mole % $O_2$, and substantially pure oxygen, i.e. greater than about 95 mole % oxygen.

* * * * *